United States Patent [19]

Hanson

[11] 3,913,601
[45] Oct. 21, 1975

[54] PRESSURE RELIEF AND CHECK VALVE COMBINATION

[75] Inventor: John R. Hanson, Warren, Pa.
[73] Assignee: Tiona-Betts, Inc., Warren, Pa.
[22] Filed: May 31, 1974
[21] Appl. No.: 475,101

[52] U.S. Cl. .................. 137/39; 137/43; 137/493.8
[51] Int. Cl.² .......................................... F16K 17/36
[58] Field of Search ............. 137/38, 43, 39, 493.8; 222/500

[56] References Cited
UNITED STATES PATENTS

| | | | |
|---|---|---|---|
| 1,724,878 | 8/1929 | Jensen | 137/493.8 X |
| 1,893,942 | 1/1933 | Jensen | 137/39 X |
| 2,351,874 | 6/1944 | Parker | 137/493.8 |
| 3,757,987 | 9/1973 | Marshall | 137/43 X |

Primary Examiner—Robert G. Nilson
Attorney, Agent, or Firm—Baldwin, Egan, Walling & Fetzer

[57] ABSTRACT

A combination pressure relief and check valve has one main passage or bore opening in one direction and two branch passages or bores opening in the opposite direction. The two twin bores or passages merge into the single bore by means of streamlined walls. In use, the single main bore is upward and a freely movable check valve is positioned to close the main bore only when the valve combination is turned upside down. The twin bores are identical and removable parts are supplied to assemble a complex in each bore comprising a lock ring, an annular valve seat, a valve disk closable against the valve seat and a helical compression spring adapted to be held between the valve disk and a disk spring-supporting retainer. These parts may be assembled to provide stream flow in the twin bores arranged for the valve disks to both open upwardly, or both open downwardly, or with the valve disks opening in opposite directions, and with helical springs suitably chosen to permit opening of the valve disks under desired predetermined pressures.

3 Claims, 4 Drawing Figures

U.S. Patent   Oct. 21, 1975   3,913,601
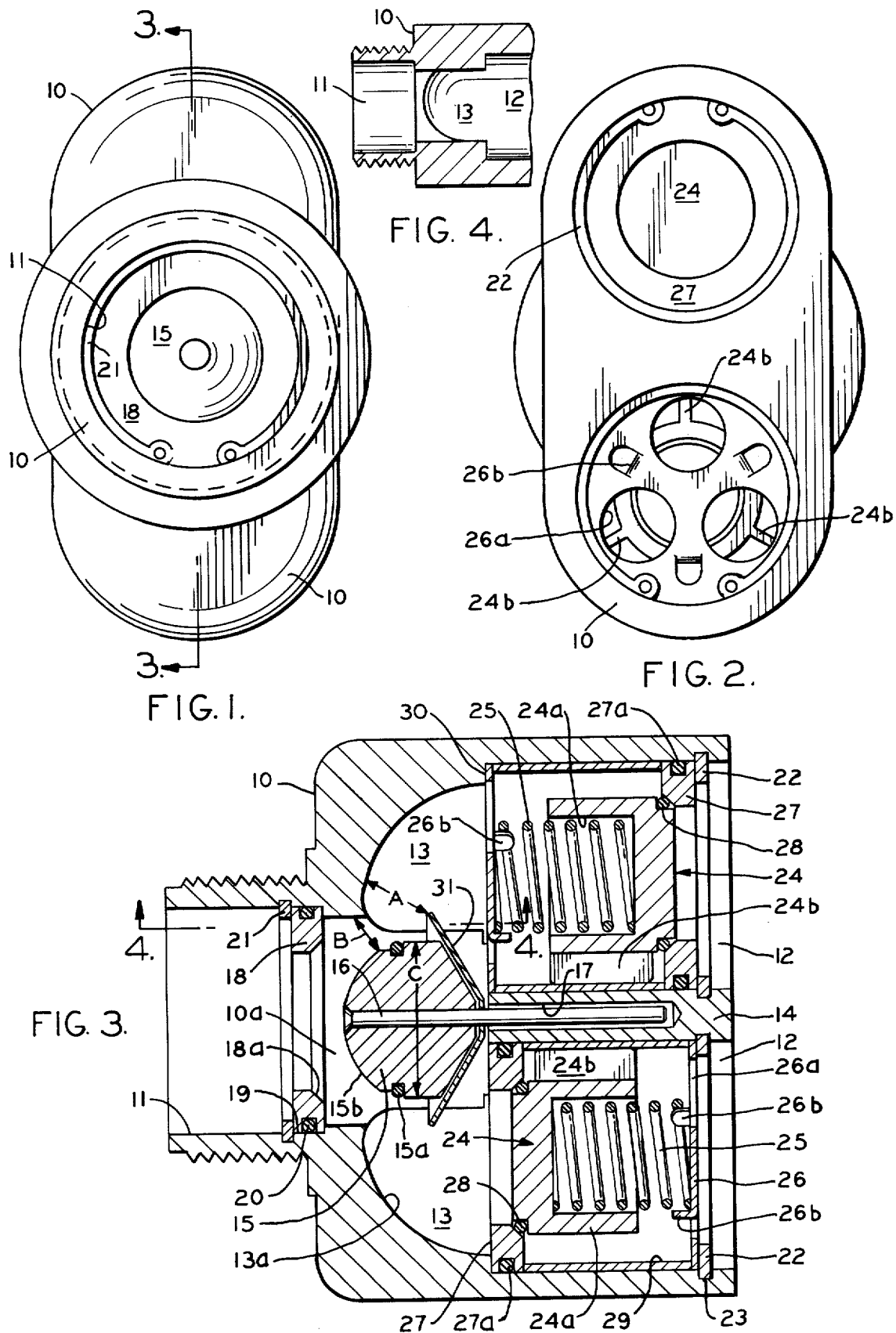

PRESSURE RELIEF AND CHECK VALVE COMBINATION

An object of the present invention is to provide a valve combination wherein a single bore opening in one direction branches into twin bores which open in the opposite direction, with spring-biased check valves, one in each of the twin bores, and designed with identical parts so that the two check valves may be assembled to open both in one direction, or both in the opposite direction, or one opening in one direction and the other in the opposite direction. A single check valve is located in a position to close the single main bore but only when the valve combination is turned upside down.

Other objects and advantages of the invention will be apparent from the accompanying drawings and description and the essential features thereof will be set forth in the appended claims.

In the drawings,

FIG. 1 is a top plan view of the valve combination;

FIG. 2 is a bottom plan view of the same valve combination;

FIG. 3 is a sectional view taken along the line 3—3 of FIG. 1; while

FIG. 4 is a fragmental sectional view taken along the line 4—4 of FIG. 3 and somewhat reduced.

The valve combination is housed in a hollow body 10 which is preferably integral. A single bore 11 opens on the side of the body 10 which is normally upward when in use. Twin bores 12 open in the direction opposite the bore 11 and shown in FIG. 3 as extending through the bottom of the body 10. These two bores are exactly the same and contain a complex of parts assembled in each in of the twin bores and, therefore, one bore only need be described. Each of the bores has a passage 13 which merges by streamlined walls 13a from the outer side of each twin bore 12 over into the single bore 11. It will be noted that the bores overlap each other laterally, the axes of each of the twin bores being offset laterally from the axis of the single bore 11 by equal amounts. A dividing partition 14 extends longitudinally between the twin bores 12.

A weighted check valve 15 is supported by a rigidly connected axial stem 16 in a suitable recess 7 in the partition 14 which holds the stem firmly in its position centrally or axially of the bore 11 but free to move up and down. The valve 15 cooperates with an annular valve seat 18 which fits in a recess 19 in the valve body and is sealed thereto by a circular O-ring 20. The valve seat is firmly held in the recess 20 by a removable lock ring 21. The valve 15 and its coacting seat 18 are concentric and the stem 16 is so arranged that it permits the valve 15 to move between the open position shown in FIG. 3 and a closed position wherein the O-ring 15a of the valve seats on a beveled annular surface 18a on the valve seat.

As mentioned before, identical complexes are assembled in each of the twin bores 12. Each complex comprises a lock ring 22 which seats in a recess 23 in the valve body. A normally closed valve 24 comprises a cup-shape valve disk 24a, the cup being of a size to receive a helical compression spring 25 which is held between the bottom of the cup 24 and a combined disk spring supporting retainer 26 which has through openings 26a permitting fluid flow through the disk and is provided also with a plurality of projections 26b which are preferably cut out of the disk 26 and turned inwardly toward the spring 25 so as to rest snugly on the outside of the spring 25. The valve 24 is normally biased toward closed position by its associated spring 25, closing against an annular valve seat 27. This valve seat is sealed against the walls of the bore 12 by an annular or circular O-ring 27a and the valve disk 24 is sealed against a beveled surface on its associated valve seat by means of an O-ring 28. A thin walled sleeve insert 29 has a single longitudinally extending slot and the sleeve is assembled in a closed position as shown in FIG. 3 and serves as a spacer between the retainer disk 26 at one end and the annular valve seat 27 at the other end. Each valve 24 is provided with a plurality of fins 24b extending radially outwardly from the side walls of the cup-shape valve disk in sliding engagement with the sleeve 29, three of such fins being shown spaced 120° apart in FIG. 2.

It will be noted in FIG. 3 that the valve 24 at the left-hand side closes upwardly and the one on the right-hand side closes downwardly. Because the parts of each complex are identical, both valves 24 may be made to open upwardly or both to open downwardly, or one to open up and the other down as shown in FIG. 3. It will be seen in FIG. 3 that the sleeve 29 serves as a spacer between the disk 26 and the annular valve seat 27, holding the parts firmly between the lock ring 22 and the body shoulder 30.

The generally conical shaped deflector 31 is unique in that its relative size, weight, shape and location is the prime reason that valve disk 15 does not move to the closed position, except by gravity, when stream flow past valve 15 is toward the closed position thereof. The normal action of stream flow in that direction would be to move a check valve such as 15 to the closed position. Referring to FIG. 3, the deflector 31 is generally cone shape opening upwardly and its upper rim in the position of FIG. 3 engages tightly against two cylindrical portions 10a of the valve body. Opposite the opening of the passages 13, the conical deflector 31 causes a fluid stream flow passing upwardly through the right-hand twin bore 12 to be deflected outwardly and then through the opening indicated at A, subsequently through the opening B and then onward through the annular valve seat 18. The flow opening at B is approximately one-half that of the opening at A and this causes the fluid flow to be directed laterally toward the arcuate top 15b of the valve 15 which produces a component tending to hold the valve in its open position as shown in FIG. 3. Thus, the valve 15 closes only when the entire combination is tilted out of the position shown in FIG. 3 so that the bore 11 is pointed horizontally or downwardly so that gravity may act upon the valve 15 to cause it to close.

In one embodiment of this invention, the conical deflector 31 is inclined approximately 30° up from the horizontal for a slant height of about nine-sixteenths inches. The conical height is about five-sixteenths inches and the cone diameter at its diverging edge is about 1¼ inches. It will be noted that the deflector 31 is complementary to the lower end of the valve 15. In this embodiment, the dimension A was about seven-sixteenths inches. The diameter C across a cylindrical portion of the valve 15 is about twenty-five thirty-seconds inches.

The combination valve assembly thus disclosed is designed for use on containers of various types which may require: (1) A pressure relief valve in one or two directions; (2) be sealed when not relieving pressure; (3) be capable of relieving at predetermined pressures; (4) be capable of checking flow through the valves if the container is overturned by accidental or other means; (5) be able to accomplish all of these requirements in a single device.

What is claimed is:

1. A pressure relief and check valve combination comprising an integral hollow body having a single cylindrical bore opening at one end of said body and identical twin cylindrical bores opening at its other end; said single bore partially overlapping said twin bores laterally; there being passages in said body, one in line with each of said twin bores; said passages merging by streamlined walls in said body from the outer side of each twin bore into said single bore; a dividing partition extending longitudinally between said twin bores; a normally closed valve in each of said twin bores; a weighted check valve mounted on a coacting axial stem; there being a recess extending longitudinally of said recess into which said stem passes; said stem mounting said weighted check valve opposite the inner end of said single bore and concentric therewith; an annular valve seat mounted in said single bore; said weighted check valve so arranged as to move between closed and open position relative to said seat; said valve combination normally in use having said single bore turned upwardly, whereby said weighted valve is normally open, but closes by gravity when said body is turned at an angle to provide a gravity component urging said weighted valve toward said seat; each of said twin bores having a recess near each its ends, said recesses spaced at identical fixed distances; two identical complexes for assembly respectively in said twin bores; each complex comprising a lock ring seatable in one of said recesses, an annular valve seat and disk spring-supporting retainer, each fitting in the other of said recesses, a valve disk, a helical compression spring adapted to be held between said disk retainer and said valve disk, and a thin-walled sleeve insert fitting snugly in each twin bore acting as a guide for each normally closed valve and as a spacer between the valve seat and the disk spring-supporting retainer in each twin bore; and a generally conical deflector positioned opening upwardly between said stem and said weighted check valve and extending into each of said passages sufficiently to cause stream flow upwardly through said passages to be deflected with a downward component on top of said weighted check valve; whereby said complexes may be assembled in said twin bores with said valve disks both opening upwardly, or both opening downwardly, or with said disks opening in opposite directions, with said helical springs suitably chosen; whereby said valve combination may act as a pressure relief valve in one or two directions, at the same or at two different pressures, and flow is checked if an attached container is overturned.

2. A combination as defined in claim 1, wherein said normally closed valve in each of said twin bores is cup shape adapted to receive its associated helical spring; a plurality of guide fins extending radially outwardly from said cup and having a sliding fit in said thin-walled sleeve; and said disk spring-supporting retainer having stream flow openings through it and having a plurality of retainer projections spaced to snugly hold its associated helical spring.

3. A combination as defined in claim 1, including circular O-rings sealing each of said valves against its associated bore; and circular O-rings sealing each normally closed valve and said weighted check valve against their associated seats.

* * * * *